Dec. 2, 1924. 1,517,887

I. BERRY

BUMPER

Filed June 4, 1924

Inventor
Irwin Berry
By
Attorney

Patented Dec. 2, 1924.

1,517,887

UNITED STATES PATENT OFFICE.

IRWIN BERRY, OF WILMETTE, ILLINOIS.

BUMPER.

Application filed June 4, 1924. Serial No. 717,738.

*To all whom it may concern:*

Be it known that I, IRWIN BERRY, a citizen of the United States, and a resident of Wilmette, Illinois, have invented certain new and useful Improvements in Bumpers, of which the following is a specification.

My invention relates generally to improvements in bumpers, but relates more particularly to vehicle bumpers adapted for automobile use.

The general object of my invention is to provide a bumper of this character which shall be better adapted to protect the automobile from injury.

Another object of my invention is to provide a bumper of such construction that it shall be practically impossible for the bumper of one car to become caught or interlocked with bumpers of other cars as now often times happens in congested traffic.

I aim also to provide a bumper construction which can be readily applied to automobiles of various makes.

Again I aim to provide a construction such that in the event of a severe collision the part of the bumper most likely to be damaged beyond repair can be easily replaced at little expense.

My invention consists generally in a bumper of the form, arrangement, construction and cooperation of the parts whereby the above named objects, together with others that will appear hereinafter, are attainable, and my invention will be more readily understood by reference to the accompanying drawings which illustrate what I consider, at the present time, to be the preferred embodiment thereof.

Figure 1:
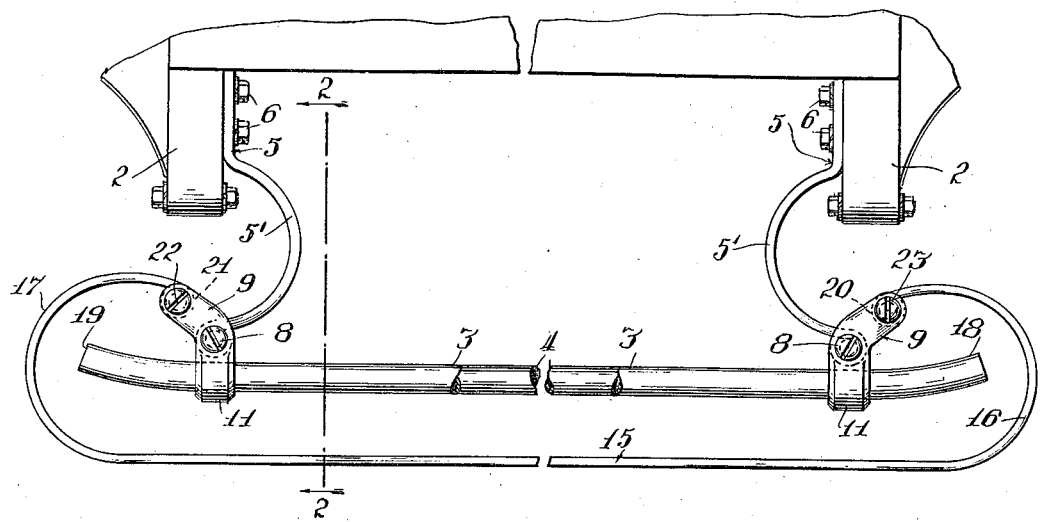
Fig. 1 is a plan view of a bumper embodying my invention showing its attachment to an automobile.
Figure 2:
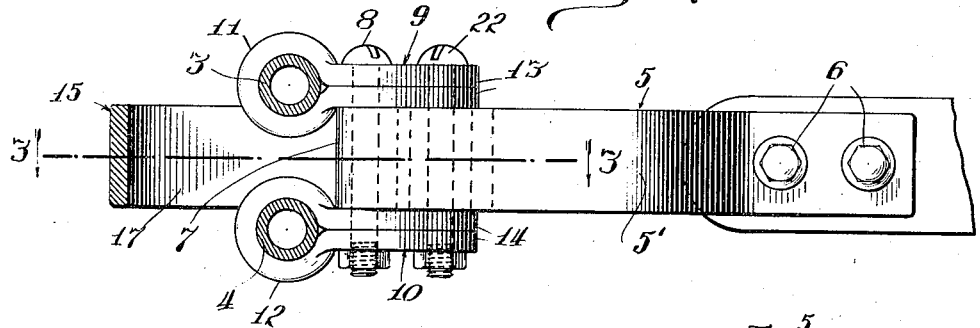
Fig. 2 is an enlarged sectional view substantially on the line 2—2 of Fig. 1.
Figure 3:
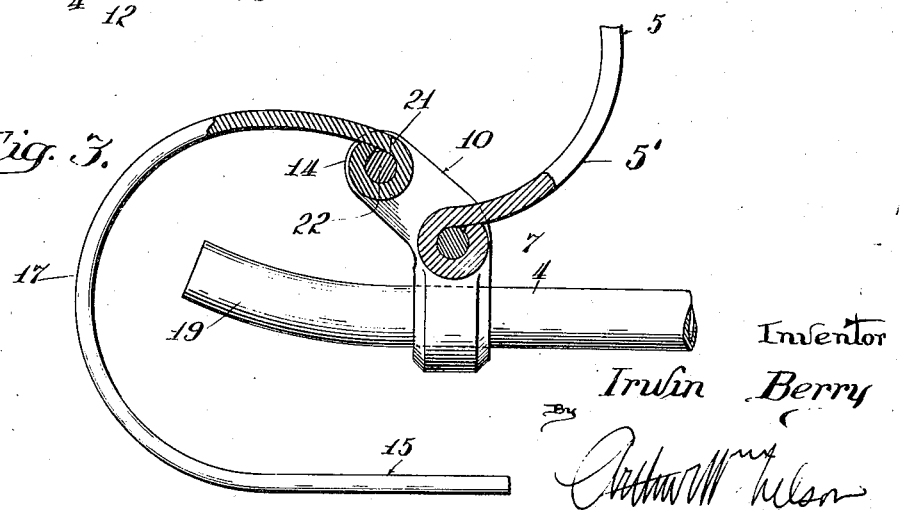
Fig. 3 is a detail sectional view substantially on the line 3—3 of Fig. 2.

The automobiles now in common use are provided with the side frame members 2 which extend usually the full length of the machine and which are of rigid construction and adapted to withstand severe strains. My bumper, as here shown is composed of spaced upper and lower tubes 3 and 4 which are supported from the automobile frame by means of the bracket members 2 by means of the bracket members 5. While two tubes or bars 3 and 4 are shown the number may be more or less so that this should be considered as by way of illustration and not by way of limitation, except where so limited in the appended claims. The brackets 5 are secured to the frame members 2 by means of bolts or other fastening devices 6 and the outer ends of the brackets 5 terminate in loop portions 7 which encompass vertically disposed bolts 8, the construction being such that as to permit of a swiveling action. The bolts 8 also pass through the upper and lower strap members 9 and 10 respectively, which have portions 11 and 12 that are wrapped around the tubes or bars 3 and 4. The strap members 9 and 10 have portions 13 and 14 which are angularly disposed in plan with respect to the portions of the straps that are wrapped around the tubes or bars 3 and 4.

The bumper is completed by means of a strap of spring metal 15, the ends 16 and 17 of which are formed to a relatively large radius passing around the outer ends 18 and 19 of the bars or tubes 3 and 4, and terminating in loop portions 20 and 21, respectively. Bolts 22 and 23 secure these end portions in place in the end portions of the strips 9 and 10, these likewise being of such construction as to permit of a swivelling action.

It will be observed that the brackets 5 are provided with curved intermediate portions 5'. I also prefer to make the brackets 5 of a material somewhat less resilient or yielding than the material of the spring bar 15 for purposes which will shortly appear. Furthermore the brackets 5 may be bent in order to support the bumper from the frames of automobiles that vary somewhat in construction.

In the event an automobile equipped with a bumper such as I have shown collides with an automobile or other object the first action is to deflect the spring bumper bar 15. Because of the nice sweeping radius of the bar 15 at its ends 16 and 17 this deflection can take place to a very marked extent without danger of permanently destroying the bar 15. If the collision is particularly severe the bar 15 will be deflected until it comes into engagement with the bar or bars 3 and 4 which will further resist such movement. If the force is sufficiently great after the bar 15 contacts the tube or bars 3 and 4, the brackets 5 will be bent, thus permitting the bumper, as a whole, to move toward the frame of the automobile. In the event of a very severe impact the bumper may move or be thrust back until the end portions 13 and 14 of the straps 9 and 10 come into contact with the automobile side frames 2 which, of course, would prevent any further movement by any ordinary collision. It will thus be seen that the bumper is adapted to absorb shocks from the gentlest to the most severe through the stepping up of the resistance to movement as the parts are moved toward the automobile. If in a severe collision the brackets 5 are bent out of shape or broken they can be replaced or repaired at relatively low cost.

The end portions 16 and 17 of the spring bar 15 due to their large radius not only serve to permit the greater deflection of the bar 15 without danger of permanent displacement as before described, but they also prevent the bumper from being interlocked with bumpers of adjacent cars or other objects, as is quite common in congested traffic.

The curve of said end portion itself forms such a rounding surface to make it difficult to secure a hooking action and, at the same time, the ends of the bar 15 whether engaged from the front or the rear have a spring action which also operates to prevent such interlocking.

The many advantages of my bumper will be understood by those skilled in the art to which this appertains without further comment.

I claim:

1. An automobile bumper embodying therein a bar, a member spaced forwardly of said bar and having rounded end portions of substantially large radii which pass about but are spaced from the end portions of said bar, the terminus of each rounded end portion of said member being operatively connected to said bar, and means supporting said bar from an automobile.

2. An automobile bumper embodying therein a bar, a member spaced forwardly of said bar and having rounded end portions of substantially large radii which pass about but are spaced from the end portions of said bar, means including brackets for operatively connecting the terminus of each rounded end portion to said bar and means supporting said bar member from an automobile.

3. An automobile bumper embodying therein, a relatively stiff bar, a relatively flexible member spaced forwardly of said bar and having flexible rounded end portions which pass about but are spaced from the end portions of said bar, the terminus of each flexible rounded end portion being operatively connected to said bar, and means supporting said bar from an automobile.

4. An automobile bumper embodying therein a bar, a member spaced forwardly of said bar and having rounded end portions of substantially large radii which pass about but are spaced from the end portions of said bar, means including brackets for operatively connecting the terminus of each rounded end portion to said bar and means supporting said bar member from an automobile, said last mentioned means being relatively stiffer than said member spaced forwardly of said bar.

5. An automobile bumper embodying therein a bar, a member spaced forwardly thereof and substantially parallel therewith, said member having rounded end portions of substantially large radii which pass about but are spaced from the end portions of said bar, the terminus of each rounded end portion of said member being operatively connected to said bar, and means supporting said bar from an automobile.

6. An automobile bumper embodying therein a bar, a member spaced forwardly thereof and substantially parallel therewith, said member having rounded end portions of substantially large radii which pass about but are spaced from the end portions of said bar, the terminus of each rounded end portion of said member being operatively connected to said bar, and means supporting said bar from an automobile, said last mentioned means being in line with the frame members of the automobile as and for the purpose specified.

7. An automobile bumper embodying therein an elongated member, a member spaced forwardly from said first mentioned member and having end portions which are spaced from the ends of the first mentioned member and pass around the same, and means securing the termini of the second mentioned member to the first mentioned member.

8. An automobile bumper embodying therein a plurality of bars spaced one above the other, a member spaced forwardly of said bars and of a height greater than the space between the spaced bars, said member having its ends formed to pass around the ends of said bars to the rear thereof, and means for supporting said bars and said member from an automobile.

9. An automobile bumper embodying therein a plurality of bars spaced one above the other, a member spaced forwardly of said bars and of a height greater than the space between the spaced bars, said member having its ends formed to pass around the ends of said bars to the rear thereof, and means for securing said bars and said member together.

10. An automobile bumper embodying therein a plurality of relatively rigid bars spaced one above the other, a relatively flexible member spaced forwardly of said bars and of a height greater than the space between the spaced bars, said member having its ends formed to pass around the ends of said bars to the rear thereof, and means for supporting said bars and said member from an automobile.

11. An automobile bumper embodying therein a plurality of bars spaced one above the other, a member spaced forwardly of said bars and of a height greater than the space between the spaced bars, said member having its ends formed to pass around the ends of said bars to the rear thereof, and means for supporting said bars and said member from an automobile, said means including bracket members of curved shape and of a more resistant character than that of said member that is spaced forwardly of said bars.

In testimony whereof, I have hereunto set my hand, this 24th day of May, 1924.

IRWIN BERRY.